US010848734B1

(12) United States Patent
Waggoner et al.

(10) Patent No.: US 10,848,734 B1
(45) Date of Patent: Nov. 24, 2020

(54) IMAGE FRAME ENCODING BASED ON PROJECTION SPACE SEAM

(71) Applicant: Amazon Technologies, Inc., Seattle, WA (US)

(72) Inventors: Charles Benjamin Franklin Waggoner, Portland, OR (US); Yongjun Wu, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 367 days.

(21) Appl. No.: 15/276,640

(22) Filed: Sep. 26, 2016

(51) Int. Cl.
| | | |
|---|---|---|
| *H04N 13/161* | (2018.01) | |
| *H04N 19/124* | (2014.01) | |
| *H04N 19/136* | (2014.01) | |
| *H04N 19/172* | (2014.01) | |
| *H04N 13/261* | (2018.01) | |
| *H04N 13/351* | (2018.01) | |

(52) U.S. Cl.
CPC ......... *H04N 13/161* (2018.05); *H04N 13/261* (2018.05); *H04N 13/351* (2018.05); *H04N 19/124* (2014.11); *H04N 19/136* (2014.11); *H04N 19/172* (2014.11)

(58) Field of Classification Search
None
See application file for complete search history.

(56) References Cited

U.S. PATENT DOCUMENTS

| | | | |
|---|---|---|---|
| 10,349,055 B1 | 7/2019 | Waggoner et al. | |
| 2001/0019363 A1* | 9/2001 | Katta | H04N 5/232 348/333.01 |
| 2015/0237351 A1 | 8/2015 | Lee et al. | |
| 2017/0237983 A1* | 8/2017 | Adsumilli | H04N 19/124 375/240.03 |
| 2017/0295356 A1* | 10/2017 | Abbas | H04N 13/161 |
| 2017/0366814 A1* | 12/2017 | Adsumilli | H04N 5/23238 |
| 2018/0027241 A1 | 1/2018 | Wu et al. | |

OTHER PUBLICATIONS

U.S. Appl. No. 15/276,641, filed Sep. 26, 2016, Waggoner et al.
U.S. Office Action dated Oct. 2, 2018 issued in U.S. Appl. No. 15/276,641.
U.S. Notice of Allowance dated Apr. 16, 2019 issued in U.S. Appl. No. 15/276,641.

* cited by examiner

*Primary Examiner* — Stuart D Bennett
(74) *Attorney, Agent, or Firm* — Weaver Austin Villeneuve & Sampson LLP

(57) ABSTRACT

Techniques are described for encoding image frames of media content to be displayed within a three-dimensional projection space. Image frames at opposing sides of a seam of the three-dimensional projection space implementing a virtual reality (VR) environment can be identified and characteristics of portions of those image frames at the seam can be determined. Encoding parameters for a portion of one image frame can then be generated based on the characteristics of the portion of the other image frame on the opposite side of the seam.

20 Claims, 6 Drawing Sheets

IMAGE FRAME ENCODING BASED ON PROJECTION SPACE SEAM

CROSS-REFERENCE TO RELATED APPLICATIONS

This disclosure is related to U.S. patent application Ser. No. 15/276,541 titled IMAGE FRAME ENCODING BASED ON PROJECTION SPACE and filed on the same day as the present patent application and incorporated by reference herein and for all purposes.

BACKGROUND

Consumers have an ever-increasing array of options for consuming media content, in terms of the types of media content (e.g., video, games, audio, text, etc.), providers of the media content, and devices for consuming media content. Media content providers are becoming increasingly sophisticated and effective at providing media content quickly and reliably to consumers.

Some devices for consuming media content include immersive devices that can simulate a user's physical presence within a virtual reality (VR) environment. Image frames of the media content are typically encoded, which includes using compression algorithms to reduce the number of bits needed to transmit the image frames to a viewer's device where they are decoded for playback. An image frame can also be transformed from a two-dimensional plane to a three-dimensional projection space for display (e.g., a spherical projection space implementing the VR environment). Unfortunately, image frames are encoded based on their characteristics within the two-dimensional plane of the image frame and therefore are not optimized for the three-dimensional projection space.

DETAILED DESCRIPTION

Figure 1:
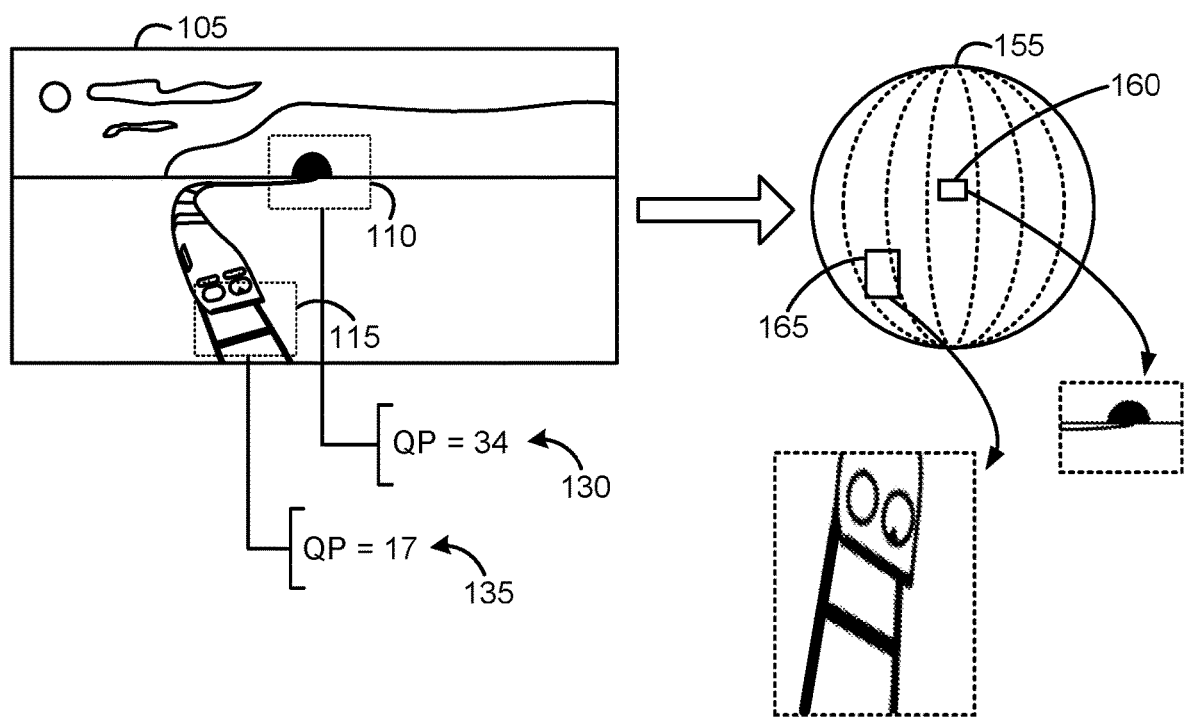
FIG. 1 illustrates an example of encoding media content using characteristics of the image frame within a projection space.

This disclosure describes media content encoding techniques for encoding two-dimensional image frames using characteristics of those image frames when transformed within a three-dimensional projection space. For example, in some video coding formats (or video compression formats), such as H.265/High Efficiency Video Coding (HEVC), the encoding process includes determining residual coefficients representing differences in image content between a portion (e.g., an M×N or M×M block of pixels as a coding unit representing an encoding region) of a target image frame to be encoded and corresponding portions of reference image frames. A quantization parameter can be applied to the residual coefficients to reduce their values as a compression technique. Different quantization parameters can be applied to different portions of the image frame.

Additionally, during or after the decoding process, an image frame can be transformed from a two-dimensional plane to a three-dimensional shape. That is, the two-dimensional (i.e., planar) image frame can be projected to a three-dimensional shape of a projection space. For example, an image frame can be transformed (or mapped or deformed) to a three-dimensional sphere, cylinder, cube, or other shape by manipulating (e.g., stretching, contracting, rotating, etc.) image content (or data) of portions of the two-dimensional image frame to fit upon all or a part of the projection space implementing a three-dimensional virtual reality (VR) environment. However, transforming a two-dimensional image frame into the projection space can result in some of the portions being manipulated differently than other portions. For example, portions close to an edge of an image frame can be stretched larger than portions close to the center of the image frame if the image frame is being transformed into a spherical projection space.

In some implementations, characteristics of the portions of the two-dimensional image frame projected within the three-dimensional shape of the projection space can be determined and used to determine the quantization parameters. For example, during encoding a smaller quantization parameter can be applied to a portion of the image frame that would be stretched to occupy a larger area of the projection space than to a portion that would occupy a smaller area of the same projection space. This results in the portion that is stretched to the larger area of the projection space being compressed less, and therefore, more visual detail can be preserved. This allows for the visual quality of the image frame in the projection space to improve, resulting in a better playback experience for a viewer. Other characteristics, such as the shape of the portion within the projection space and geometrical changes of the image content of the portion within the projection space (e.g., whether a diagonal line is transformed into a horizontal or vertical line) can also be considered.

This disclosure also describes media content encoding techniques for encoding image frames that join at a seam of a three-dimensional projection space. For example, in a projection space implementing a three-dimensional cubic projection having six faces (or sides), a different image frame can be displayed for each of the faces. As a result, an image frame is adjacent to another other image frame at a seam of the cubic projection. In some implementations, the encoding parameters (e.g., quantization parameter) of the edge of one image frame can be based upon the characteristics of the edge of another image frame that is to be displayed on the other side of the seam of the cubic projection. This results in a reduction of the perception of a visual discontinuity at the seam that would occur if the images frames on the different sides of the seam (i.e., different faces) are encoded with significantly different encoding parameters. As such, the visual quality of the playback of the media content can be improved.

FIG. 1 provides more detail regarding media content encoding techniques for encoding two-dimensional image frames using characteristics of those image frames transformed within a three-dimensional projection space. As shown in FIG. 1, image frame 105 is a two-dimensional planar image frame that is transformed onto (or into) a three-dimensional and spherical projection space 155. Since image frame 105 is a two-dimensional plane, its transformation within the three-dimensional projection space 155 results in the deformation of its various portions. In the example of FIG. 1, this results in projection space portion 160 including the image content of portion 110 of image frame 105. Projection space portion 165 includes the image content of portion 115 of image frame 105.

Portions 110 and 115 can be a similar size in image frame 105. However, their corresponding projection space portions 160 and 165 can be somewhat deformed and result in different sizes due to the manipulations needed to transform image frame 105 to projection space 155. That is, transforming the two-dimensional and planar image frame 105 into the three-dimensional spherical projection space 155 involves a decoder "stretching" image frame 105 to fit upon projection space 155. As a result, in FIG. 1, while projection space portion 160 is relatively similar (e.g., a similar size, shape, orientation, etc.) to portion 110 of image frame 105, projection space portion 165 is different (e.g., a different size, shape, and orientation) from portion 115 of image frame 105. Due to the different manipulations of portions 110 and 115, portions 160 and 165 are also different in shape with respect to each other. Accordingly, portions 160 and 165 might have a different pixel density (i.e., number of pixels from image frame 105 for the area of projection space 155 that they are transformed to occupy) despite their corresponding portions 110 and 115 having the same number of pixels (if they are the same size) within image frame 105. This can happen because portions of image frame 105 close to its center might not be stretched much during the transformation within projection space 155, but portions of image frame 105 close to the edges might experience significant stretching.

As previously discussed, the encoding process for media content can include determining residual coefficients representing differences in image content between a portion of a target image frame (e.g., image frame 105) and corresponding portions of reference image frames (e.g., other image frames of the same media content). A quantization parameter can be applied to the residual coefficients to reduce their values as a compression technique (e.g., divide the values of the residual coefficients by the quantization parameter). Different quantization parameters can be applied to different portions of the image frame. In some scenarios, quantization parameters can be determined based upon characteristics of image frame 105. For example, portions that are larger might correspond to a smaller quantization parameter than a smaller portion so that the larger portions can be compressed less and therefore preserve more visual detail. As another example, portions with image content including certain types of geometric image content, such as horizontal or vertical lines, might be associated with a lower quantization parameter to preserve those details better when the image frame is decoded and played back.

However, in the example of FIG. 1, since image frame 105 is to be played back within projection space 155, the image content of the portions can change. For example, as previously discussed, the sizes of the portions can change significantly with respect to each other as in the case of projection space portions 160 and 165. As another example, the geometric image content of the portions can change, e.g., lines that were previously horizontal or vertical in image frame 105 might end up diagonal in projection space 155, and lines that were diagonal in image frame 105 can end up being horizontal or vertical in projection space 155. In FIG. 1, portion 115 includes image content portraying railroad tracks in a diagonal orientation, but the corresponding projection space portion 165 (i.e., portion 115 stretched to fit within projection space 155) includes the railroad track image content in a more vertical orientation due to a rotation of the portion during the transformation.

In FIG. 1, the characteristics of the portions of image frame 105 when they are transformed into the portions of projection space 155 can be considered when encoding image frame 105 to improve the quality of the playback experience of the media content. If an encoder knows how a decoder would transform image frame 105 into projection space 155, and therefore, how the image content would appear to a viewer during playback, then that information can be used to determine or adjust encoding parameters used to encode image frame 105. For example, the encoder might determine that image frame 105 would be decoded and transformed upon a spherical projection space. As previously discussed, different locations of portions of image frame 105 might result in different manipulations to the image content within those portions (e.g., portions close to an edge might be stretched and rotated more than portions close to the center of an image frame). Additionally, the portions can be analyzed to determine whether any changes to the geometric image content might occur when image frame 105 is transformed into projection space 155. Moreover, any changes to the shapes of the portions within projection space 155 can be determined. Based on the characteristics of the portions within projection space 155 (e.g., projection space portions 160 and 165), quantization parameters 130 and 135 can be determined for encoding portions 110 and 115 of image frame 105, respectively. That is, rather than only considering characteristics of image frame 105 within a two-dimensional plane when determining encoding parameters such as quantization parameters 130 and 135, characteristics of image frame 105 transformed within a three-dimensional projection space 155 can also be used to determine the encoding parameters. As a result, image frame 105 can be encoded based on how it would be displayed within projection space 155, and therefore, improve the visual quality of the playback experience of the media content for a viewer.

Figure 2:
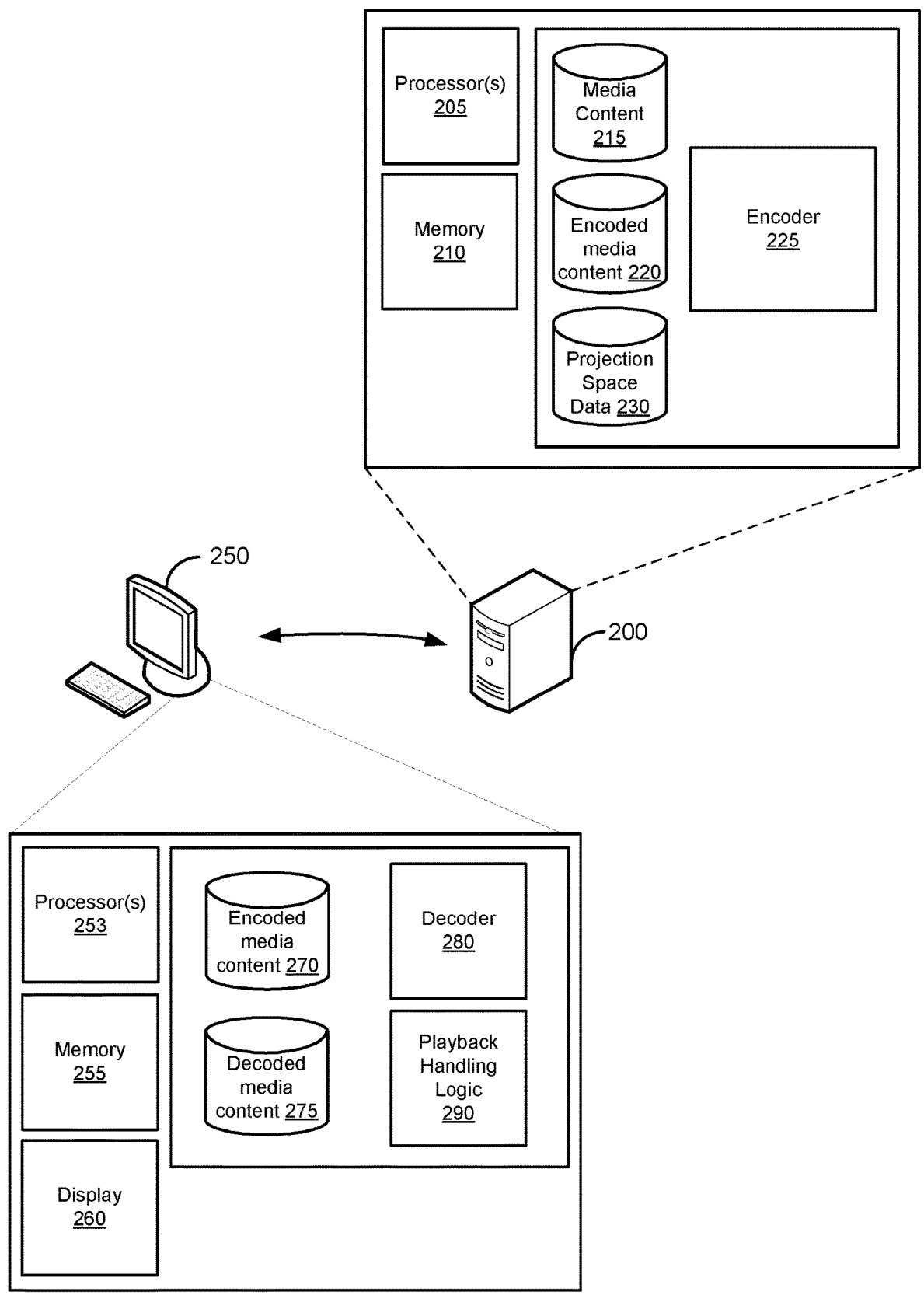
FIG. 2 illustrates an example of a computing environment for encoding media content.

FIG. 2 illustrates an example of a computing environment for encoding media content. The computing environment of FIG. 2 includes encoding server 200 to encode media content for playback on viewer device 250. Viewer device 250 can receive encoded media content from a media server or encoding server 200, or it might receive media content on a physical medium. In FIG. 2, viewer device 250 is a desktop computer. However, related functionality can be implemented in laptop computers, televisions, tablets, smartphones, wearable devices, virtual or augmented reality headsets, video game consoles, etc.

Encoding server 200 can conform to any of a wide variety of architectures and its functionality may be implemented by a variety of servers. For example, one server might encode media content and the encoded media content might be provided to another server, for example, belonging to a content delivery network (CDN). As such, the functionality and components of encoding server 200 can use one or more servers and be deployed at one or more geographic locations (e.g., across different countries, states, cities, etc.) using a network such as any subset or combination of a wide variety of network environments including, for example, TCP/IP-based networks, telecommunications networks, wireless networks, cable networks, public networks, private networks, wide area networks, local area networks, the Internet, the World Wide Web, intranets, extranets, etc. Multiple entities may be involved in the encoding and delivery of media content and data related to the media content, including content providers, internet service providers (ISPs), providers of content delivery networks (CDNs), etc. The functionality described herein also may be implemented by one or more different entities. For example, the functionality to provide playback of media content can be integrated into a video player or software client under control of one entity (e.g., on viewer device 250), integrated into a separate app from another entity, implemented in an edge server or content server of a CDN, a server of an ISP, etc. In some implementations, media content can be streamed in fragments from a media server. In other implementations, encoding server 110 can encode the media content and the entire media content can be downloaded to viewer device 250 via the media server. In some implementations, media content can be encoded by encoding server 200 and provided to viewer device 250 via a physical medium (e.g., a disc such as DVD, Blu-Ray, etc.).

It should be noted that, despite references to particular computing paradigms and software tools herein, the computer program instructions on which various implementations disclosed herein are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular types of media content herein is merely by way of example. Suitable alternatives known to those of skill in the art may be employed.

In FIG. 2, encoding server 200 can include various types of logic used to implement encoder 225 to encode media content stored in media content 215 using projection space data 230 and store encoded media content in memory such as encoded media content 220. Encoding server 200 can include one or more processors 205, memory 210, and other hardware components or circuits to encode media content and provide the encoded media content to viewer devices 250. For example, processor(s) 205 can execute stored instructions in memory of encoding server 200 to implement the encoding techniques disclosed herein.

Viewer device 250 can also include various types of logic used to implement a decoder 280 to decode the encoded media content 270 and store the decoded media 275, as well as playback handling logic 290 to play back the decoded media content on display 260. Viewer device 250 can include one or more processors 253, memory 255, and other hardware components or circuits to decode and play back the encoded media content. For example, the processor(s) 253 of viewer device 250 can execute stored instructions in memory 255 to implement decoding techniques based on the encoding techniques disclosed herein.

Figure 3:
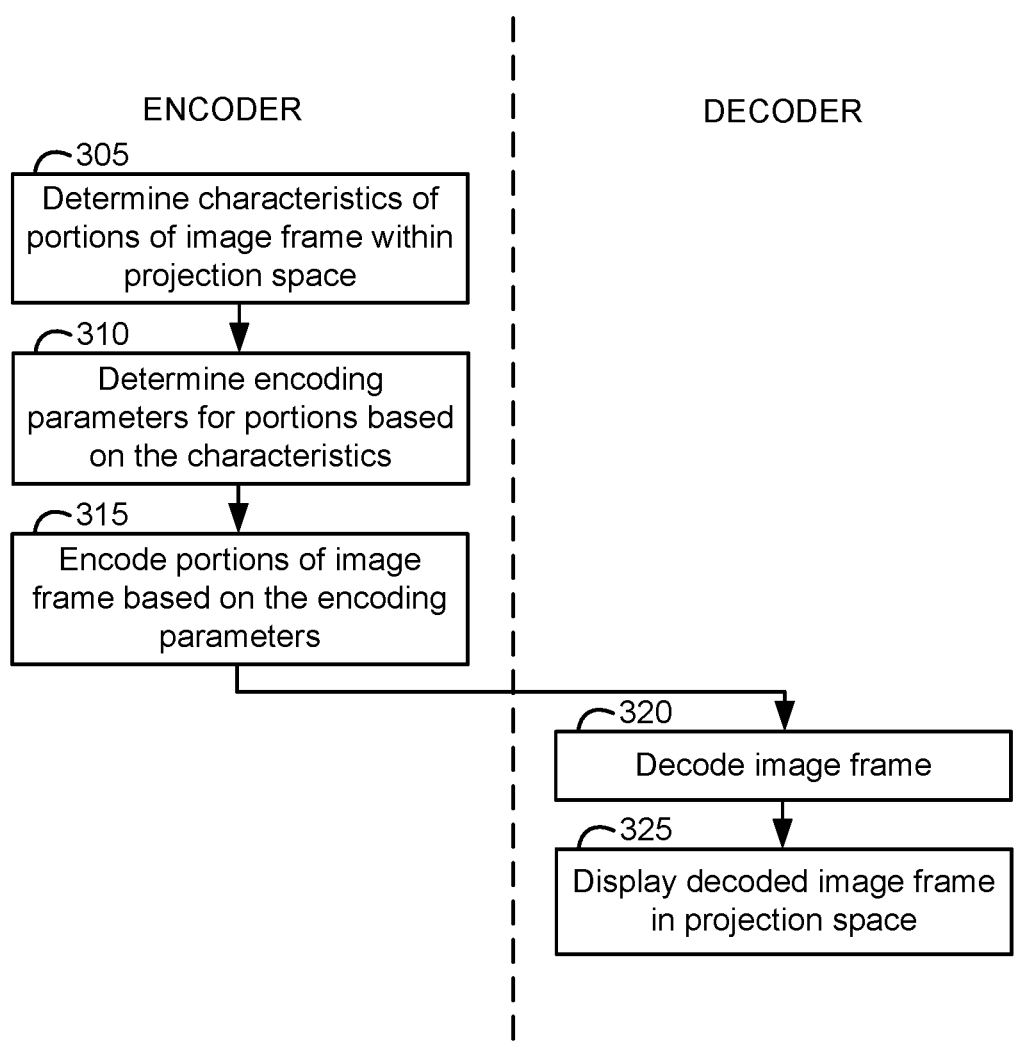
FIG. 3 is a flowchart illustrating an example of encoding media content.
Figure 4:
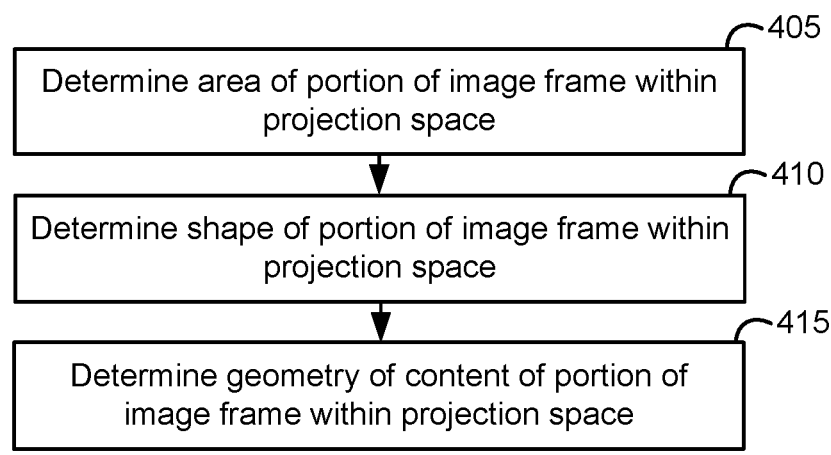
FIG. 4 is a flowchart illustrating determining characteristics of portions of an image frame within a projection space.

A specific implementation will now be described with reference to FIG. 1, the computing environment of FIG. 2, and the flow diagrams of FIGS. 3 and 4. In FIG. 3, encoder 225 of encoding server 200 determines characteristics of portions of an image frame of media content within a projection space (305) and those characteristics are used to determine encoding parameters for the portions of the image frame (310) and then encode the portions using those encoding parameters (315). For example, in some video coding formats (or video compression formats), such as H.265/High Efficiency Video Coding (HEVC), an image frame can be partitioned, or segmented, into a variety of portions called coding units, each representing a block of pixels. Other video coding formats, such as H.264/MPEG-4 Advanced Video Coding (AVC), VC-1, VP9, etc. also divide an image frame into different portions (e.g., slices, tiles, flexible macroblock ordering (FMO), etc.) to facilitate the encoding process.

If the encoded media content including the image frame is to be encoded and provided to a viewer device that will decode the image frame and play it back within a spherical projection space, then the characteristics of the image frame in the spherical projection space can be determined. For example, in FIG. 1, image frame 105 is to be transformed to be displayed within a spherical projection space 155, as previously discussed. In one implementation, encoding server 200 can include data indicating how the two-dimensional and planar image frame 105 would be transformed within the three-dimensional spherical projection space 155. In another implementation, encoding server 200 can transform image frame 105 to a spherical projection space to determine how image frame 105 would be similarly transformed within projection space 155 by a viewer device.

Several different characteristics of how the portions of image frame 105 are transformed within the projection space can be determined. FIG. 4 is a flowchart illustrating determining characteristics of portions of an image frame within a projection space. For example, the area of the projection space that the transformed portions would occupy within the projection space can be determined (405). As previously discussed, some portions of image frame 105 can be manipulated differently than other portions during the transformation from image frame 105 to spherical projection space 155. For example, a portion close to an edge of image frame 105 might be stretched larger than a portion close to the center of image frame 105 when they are transformed to spherical projection space 155. As a result, portions of a similar size in image frame 105 can be transformed into different sizes in spherical projection space 155 (e.g., as discussed regarding projection space portions 160 and 165 in FIG. 1) despite being similar sizes in image frame 105.

A portion of image frame 105 that occupies more of the area of projection space 155 can be encoded using a different quantization parameter than a portion that occupies less of the area of projection space 155. In one example, if two portions of similar (e.g., same) size in image frame 105 are transformed within projection space 155 to have two different sizes, this would result in the pixel density of the portions within projection space 155 to be different. Quantization parameters can be adjusted such that the portion of image frame 105 that is transformed into the portion of projection space 155 that has a lower pixel density can have a lower quantization parameter than the portion with a higher pixel density (assuming that other factors contributing to the determination of the quantization parameters are similar).

For example, initially quantization parameters for portions 110 and 115 of image frame 105 can be determined without consideration to their portrayal within spherical projection space 155 (i.e., portions 160 and 165, respectively). That is, quantization parameters for portions 110 and 115 can be determined by analyzing characteristics of image frame 105. Second, encoder 225 can then determine the areas that they would occupy within spherical projection space 155 and adjust the quantization parameters based on the determined areas. For example, an offset based on the amount of area that a portion occupies in the projection space can be added or subtracted from the previously determined quantization parameter to generate an adjusted quantization parameter to encode the portion. As another example, the quantization parameters can be weighted based on the areas of the corresponding portions in the projection space.

The shape of the portions of image frame 105 when transformed within projection space 155 can also be determined (410). If a portion of image frame 105 would be transformed more along one axis than another, for example, stretched longer along the horizontal axis than the vertical axis, then the quantization parameter for the portion can be adjusted in a similar manner to be different than if a similar portion was stretched longer along the vertical axis than the horizontal axis.

Geometrical changes to the image content (e.g., whether a diagonal line in image frame 105 is transformed into a horizontal or vertical line within projection space 155) can also be determined (415). As previously discussed, the geometry of image content of the portions can change when transformed into the projection space, for example, lines that were previously horizontal or vertical in image frame 105 might end up diagonal in projection space 155, and lines that were diagonal in image frame 105 can end up being horizontal or vertical (or change in angle with respect to a horizon such that they are more horizontal or vertical) in projection space 155. As an example, in FIG. 1, portion 115 includes image content portraying railroad tracks in a diagonal orientation, but the corresponding projection space portion 165 (i.e., portion 115 stretched to fit within projection space 155) includes the railroad track image content in a more vertical orientation due to a rotation of the portion during the transformation. In some implementations, horizontal and vertical lines should be compressed less (i.e., preserve more of their visual detail), and therefore, if a portion of image frame 105 would have more horizontal or vertical lines within projection space 155 then the quantization parameter can be reduced to preserve some of the visual detail provided by those lines. In some implementations, image content having more vertical lines within the projection space can be preserved by using a lower quantization parameter. Horizontal and vertical lines might be preserved because poor detail for those lines is more noticeable for a viewer during playback.

Following the determination of encoding parameters (e.g., quantization parameters, selection of a quantization matrix, enabling or disabling filters such as sharpening filters, adaptive deadzone parameters, and more) for portions of image frame 105 based on how those portions are transformed within spherical projection space 155, the portions are encoded using those determined encoding parameters (315). Viewer device 250 can then receive the encoded media content and decode an image frame (320) and display the decoded image frame in the projection space (325), e.g., within projection space 155. Since the media content was encoded using encoding parameters based on how the image frame would be displayed within projection space 155, the visual quality of the decoded and displayed image frame can be improved for the viewer.

This disclosure also describes media content encoding techniques for encoding image frames that join at an edge or seam of a three-dimensional projection space. In some implementations, multiple image frames can be transformed to be within the same projection space. For example, a three-dimensional cubic projection space can have six faces with a different image frame to be displayed for each of the different faces. As a result, image frames can join at opposing sides of a seam of the cubic projection space (e.g., the edges of two image frames can be across from each other along the seam of the cubic projection space).

Usually, adjacent portions of an image frame are encoded such that they are closer in quality (e.g., differences in quality are constrained to a narrow range, or the quality of the portions are set to be the same). This allows for a gradual difference in quality among different portions of the image frame, and therefore, an abrupt change that would otherwise be perceptible by a viewer can be avoided. However, image frames are usually encoded without reference to other image frames to be displayed within the same projection space. As a result, an abrupt change in the visual quality of the playback of the media content can be perceived by viewers at the seams of the projection space.

In some implementations, a portion of an edge of an image frame can be encoded based on characteristics of a portion of an edge of another image frame that would be displayed at the other side of the seam of a projection space. This can allow for the portions of the image frames at the seams of the cubic projection space to be similar in quality, and therefore, not be distracting to a viewer during the playback of the media content.

Figure 5:
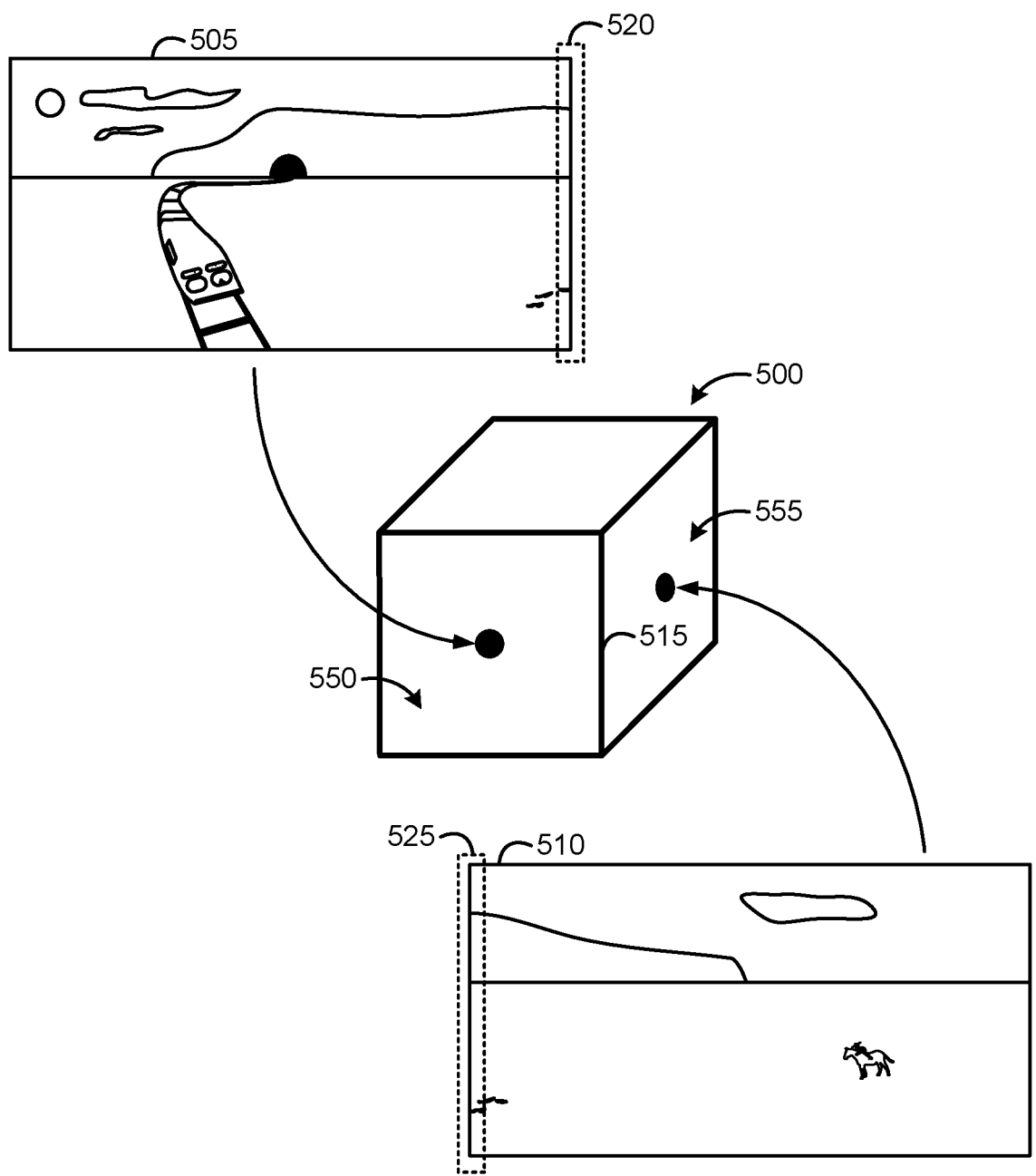
FIG. 5 illustrates an example of encoding portions of image frames corresponding to seams of a projection space.

FIG. 5 provides more detail regarding encoding portions of image frames corresponding to edges of a projection space. In FIG. 5, each of the different faces of a cubic projection space 500 can correspond with a different image frame. For example, image frame 505 is transformed to be placed within face 550 of projection space 500 and image frame 510 is transformed to be placed within face 555 of projection space 500. Edge 520 of image frame 505 would be at seam 515 of projection space 500. Likewise, edge 525 of image frame 510 would also be at seam 515, opposite of edge 520 of image frame 505. As a result, during playback of the media content, image content can stretch across both image frames in the projection space through seam 515. For example, in image frame 505, the mountain in the background stretches to edge 520 and continues onto edge 525 of image frame 510. The foreground also stretches across both image frames through seam 515. This means that edge 520 and edge 525 are opposing (or adjacent) to each other around seam 515 of projection space 500. However, if edge 520 of image frame 505 and edge 525 of image frame 510 are encoded differently (e.g., encoded such that they are at a significantly different quality), then the transition of the image content at seam 515 of projection space 500 can be abrupt, and therefore, distracting to a viewer.

Figure 6:
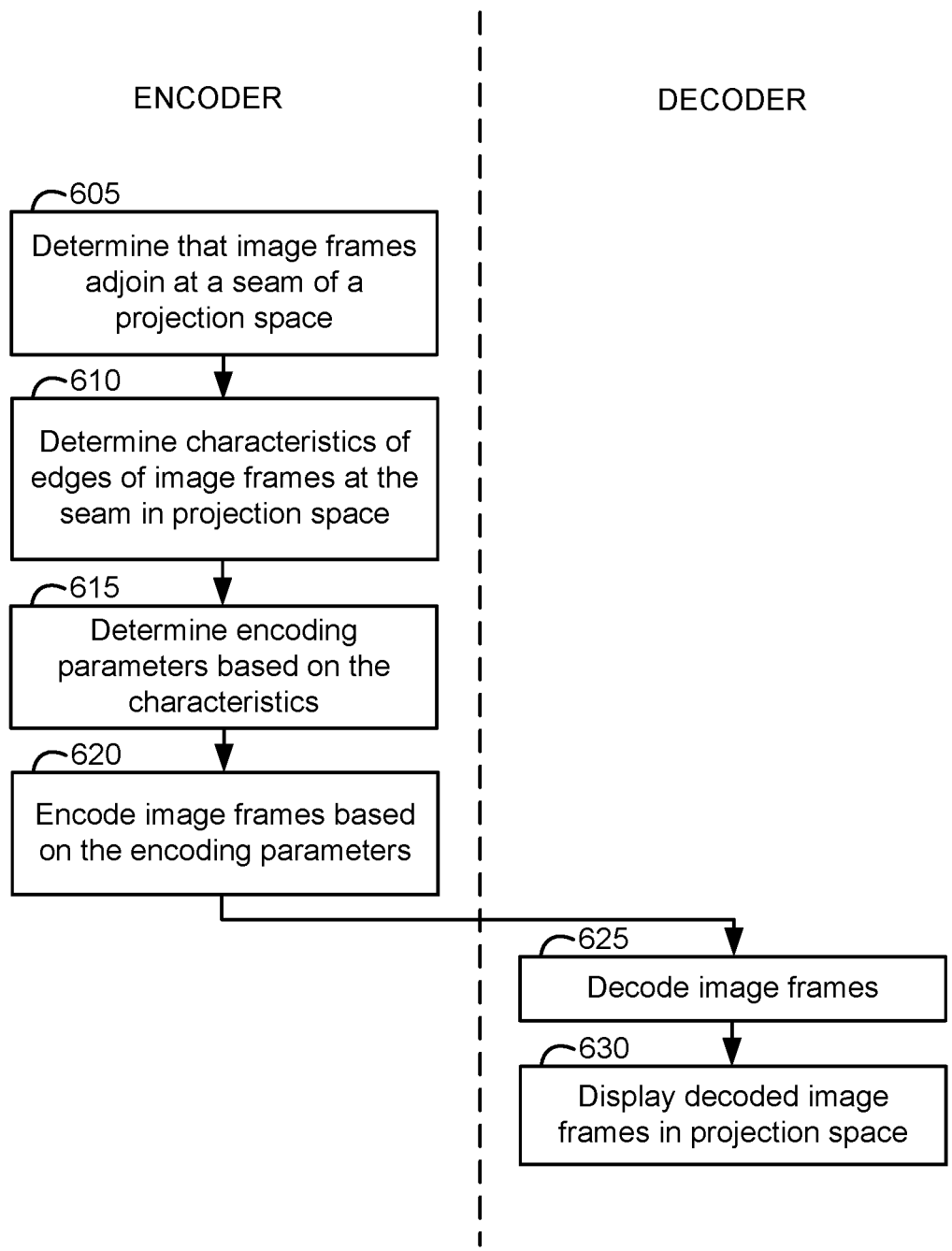
FIG. 6 is a flowchart illustrating an example of encoding media content.

To improve the transition of image content at edge 515 of projection space 500, an edge of an image frame can be encoded based on characteristics of an edge of another image frame that would be displayed at the other side of a seam of a projection space. FIG. 6 is a flowchart illustrating an example of encoding media content. In FIG. 6, image frames that adjoin at a seam of a projection space can be determined (605). For example, in FIG. 5, if the image frames corresponding to the different faces of projection space 500 are to be encoded, image frames 505 and 510 can be identified as adjoining at seam 515. In some implementations, more than two image frames can be identified. For example, the image frames corresponding to the top and bottom faces of projection space 500 can also be identified since their corners also adjoin with the top and bottom of seam 515, respectively.

Characteristics of the edges of the image frames at the seam in the projection space can then be identified (610). For example, the image content (e.g., the type of image content, color information, etc.) of edges of the image frames that adjoin at the seam can be identified. In another example, encoding parameters for those edges of the image frames that are determined without consideration of the other image frame at the seam can be identified. For example, image frames 505 and 510 can be separately analyzed and encoding parameters (e.g., quantization parameters) can be determined for edges 520 and 525 (or portions thereof).

Based on those characteristics, encoding parameters for the edges of the image frames can be determined (615). For example, based on the characteristics of the neighboring edge of the other image frame (i.e., the edge of the image frame on the opposite side of the seam of the projection space), encoding parameters, such as a quantization parameter, can be determined. As another example, in FIG. 5, the portions of edge 520 of image frame 505 might be determined to be encoded with a first quantization parameter based on an encoder analyzing image frame 505. That first quantization parameter can then be adjusted to generate a new quantization parameter to encode edge 520 of image frame 505, similar to the examples discussed previously (e.g., increased or decreased by an offset, weighted, etc.), based on the characteristics of edge 525 of image frame 510. Likewise, a quantization parameter corresponding to edge 525 of image frame 510 can also be generated based on the characteristics of edge 520 of image frame 505. In some implementations, the final quantization parameters for edges 520 and 525 can be set to be the same. In some implementations, the quantization parameters used to encode edges 520 and 525 can be within a quantization parameter range that is determined based on edges 520 and 525 (e.g., based on the quantization parameters first determined without reference to the other image frame on the opposite side of the seam of the projection space). This can allow for different quantization parameters for the edges on the sides of the seam, but the difference can be set to an amount such that the transition of the image content would not be disruptive. The image frames can then be encoded based on the encoding parameters (620). The encoded image frames can then be provided to a decoder of a viewer device to be decoded (625) and then displayed within the projection space (630).

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computer implemented method comprising:
   determining, by an encoder, that a portion of a first image frame of media content is to be displayed on a first side of a seam of a three-dimensional projection space representing a virtual reality (VR) environment;
   determining, by the encoder, that a portion of a second image frame of the media content that is separate from the first image frame is to be displayed on a second side of the seam of the three-dimensional projection space;
   determining, by the encoder, characteristics of a portion of the first image frame corresponding to the first side of the seam based at least in part on a transformation of the portion of the first image frame from a two-dimensional and planar space to the three-dimensional projection space;
   separate from determining the characteristics of the portion of the first image frame, determining, by the encoder, characteristics of a portion of the second image frame corresponding to the second side of the seam of the three-dimensional projection space;
   determining, by the encoder, first encoding parameters for the portion of the first image frame based on the characteristics of the portion of the first image frame and the characteristics of the portion of the second image frame;
   determining, by the encoder, second encoding parameters for the portion of the second image frame based on the characteristics of the portion of the second image frame and the characteristics of the portion of the first image frame;
   encoding, by the encoder, the portion of the first image frame using the first encoding parameters to produce a first encoded image frame; and
   separate from encoding the portion of the first image frame, encoding, by the encoder, the portion of the second image frame using the second encoding parameters to produce a second encoded image frame.

2. The computer implemented method of claim 1, wherein the first encoding parameters and the second encoding parameters includes quantization parameters for the corresponding portions of the first and second image frames.

3. The computer implemented method of claim 1, wherein determining the first encoding parameters includes determining a quantization parameter for the portion of the first image frame, and adjusting the quantization parameter based on the characteristics of the portion of the second image frame.

4. The computer implemented method of claim 1, wherein the first image frame at the first side of the seam represents a first surface of the three-dimensional projection space, and the second image frame at the second side of the seam represents a second surface of the three-dimensional projection space, image content to be displayed across the first image frame and the second image frame through the seam.

5. A system comprising:
   one or more processors and memory configured to:
   determine that a portion of a first image frame is to be displayed on a first side of a seam of a three-dimensional projection space representing a virtual reality (VR) environment;
   determine characteristics of a portion of the first image frame adjacent the first side of the seam based at least in part on a transformation of the portion of the first image frame from a two-dimensional and planar space to the three-dimensional projection space;
   separate from determining the characteristics of the portion of the first image frame, determine characteristics of a portion of a second image frame that is separate from the first image frame to be displayed on a second side of the seam opposing the first side;
   determine first encoding parameters for the portion of the first image frame based on the characteristics of the portion of the first image frame and the characteristics of the portion of the second image frame;

determine second encoding parameters for the portion of the second image frame based, at least in part, on the characteristics of the portion of the second image frame;

encode the portion of the first image frame using the first encoding parameters to produce a first encoded image frame; and separate from encoding the portion of the first image frame, encode the portion of the second image frame using the second encoding parameters to produce a second encoded image frame.

6. The system of claim 5, wherein the first encoding parameters include a quantization parameter, and the quantization parameter is used to compress the portion of the first image frame during encoding.

7. The system of claim 5, the one or more processors and memory further configured to:

determine the second encoding parameters for the portion of the second image frame based also on the characteristics of the portion of the first image frame.

8. The system of claim 7, wherein determining the first encoding parameters includes determining a value for a first parameter for the portion of the first image frame, and adjusting the value of the first parameter based on the characteristics of the portion of the second image frame.

9. The system of claim 7, wherein the projection space is a three-dimensional projection space and the first and second image frames are two-dimensional and planar spaces.

10. The system of claim 9, wherein the first image frame at the first side of the seam represents a first surface of the three-dimensional projection space, and the second image frame at the second side of the seam represents a second surface of the three-dimensional projection space.

11. The system of claim 7, wherein determining the first encoding parameters includes determining a first value of a first parameter based on the portion of the first image frame, determining the second encoding parameters includes determining a second value of a second parameter based on the portion of the second image frame, and determining a value range based on the first value and the second value, and adjusting the first value and the second value to be within the value range.

12. The system of claim 5, wherein the projection space is one of a cubic, cylindrical, or spherical three-dimensional projection space.

13. A computer program product comprising one or more non-transitory computer-readable media having computer program instructions stored therein, the computer program instructions being configured such that, when executed by one or more computing devices, the computer program instructions cause the one or more computing devices to:

determine that a portion of a first image frame is to be displayed on a first side of a seam of a three-dimensional projection space representing a virtual reality (VR) environment;

determine characteristics of a portion of the first image frame adjacent the first side of the seam based at least in part on a transformation of the portion of the first image frame from a two-dimensional and planar space to the three-dimensional projection space;

separate from determining the characteristics of the portion of the first image frame, determine characteristics of a portion of a second image frame that is separate from the first image frame to be displayed on a second side of the seam opposing the first side;

determine first encoding parameters for the portion of the first image frame based on the characteristics of the portion of the first image frame and the characteristics of the portion of the second image frame;

determine second encoding parameters for the portion of the second image frame based, at least in part, on the characteristics of the portion of the second image frame;

encode the portion of the first image frame using the first encoding parameters to produce a first encoded image frame; and separate from encoding the portion of the first image frame, encode the portion of the second image frame using the second encoding parameters to produce a second encoded image frame.

14. The computer program product of claim 13, wherein the first encoding parameters include a quantization parameter, and the quantization parameter is used to compress the portion of the first image frame during encoding.

15. The computer program product of claim 13, the computer program instructions to further cause the one or more computing devices to:

determine second encoding parameters for the portion of the second image frame based also on the characteristics of the portion of the first image frame.

16. The computer program product of claim 15, wherein determining the first encoding parameters includes determining a value for a first parameter for the portion of the first image frame, and adjusting the value of the first parameter based on the characteristics of the portion of the second image frame.

17. The computer program product of claim 15, wherein the projection space is a three-dimensional projection space and the first and second image frames are two-dimensional and planar spaces.

18. The computer program product of claim 17, wherein the first image frame at the first side of the seam represents a first surface of the three-dimensional projection space, and the second image frame at the second side of the seam represents a second surface of the three-dimensional projection space.

19. The computer program product of claim 15, wherein determining the first encoding parameters includes determining a first value of a first parameter based on the portion of the first image frame, determining the second encoding parameters includes determining a second value of a second parameter based on the portion of the second image frame, and determining a value range based on the first value and the second value, and adjusting the first value and the second value to be within the value range.

20. The computer program product of claim 13, wherein the projection space is one of a cubic, cylindrical, or spherical three-dimensional projection space.

* * * * *